(12) United States Patent
Takebe et al.

(10) Patent No.: US 8,752,046 B2
(45) Date of Patent: Jun. 10, 2014

(54) VIRTUAL CALCULATING MACHINE SYSTEM, VIRTUAL CALCULATING MACHINE CONTROL APPARATUS AND VIRTUAL CALCULATING MACHINE CONTROL METHOD

(75) Inventors: Akio Takebe, Kawasaki (JP);
Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 13/045,702

(22) Filed: Mar. 11, 2011

(65) Prior Publication Data

US 2011/0231842 A1    Sep. 22, 2011

(30) Foreign Application Priority Data

Mar. 19, 2010   (JP) ................. 2010-065275

(51) Int. Cl.
G06F 9/455   (2006.01)
(52) U.S. Cl.
USPC .............................................. 718/1; 709/208
(58) Field of Classification Search
None
See application file for complete search history.

(56) References Cited

U.S. PATENT DOCUMENTS

| | | | | |
|---|---|---|---|---|
| 6,862,286 | B1* | 3/2005 | Tams et al. ............... | 370/401 |
| 7,685,635 | B2* | 3/2010 | Vega et al. ............... | 726/17 |
| 7,934,006 | B2 | 4/2011 | Kato et al. | |
| 7,975,017 | B1* | 7/2011 | Kuzkin et al. ........... | 709/208 |
| 2004/0167996 | A1* | 8/2004 | Takamura et al. ....... | 710/5 |
| 2006/0064523 | A1 | 3/2006 | Moriki et al. | |
| 2006/0107269 | A1* | 5/2006 | Bantz et al. ............. | 719/310 |
| 2006/0161617 | A1* | 7/2006 | Zhong et al. ............ | 709/203 |
| 2008/0098194 | A1 | 4/2008 | Hashimoto et al. | |
| 2011/0126269 | A1* | 5/2011 | Youngworth ............ | 726/4 |
| 2011/0145819 | A1* | 6/2011 | McKenzie et al. ...... | 718/1 |
| 2011/0145886 | A1* | 6/2011 | McKenzie et al. ...... | 726/1 |

FOREIGN PATENT DOCUMENTS

| | | |
|---|---|---|
| JP | 2004-258840 | 9/2004 |
| JP | 2006-85543 | 3/2006 |
| JP | 2006-195981 | 7/2006 |
| JP | 2007-219711 | 8/2007 |
| JP | 2007-233815 | 9/2007 |
| JP | 2008-4072 | 1/2008 |
| JP | 2008-102667 | 5/2008 |

OTHER PUBLICATIONS

Japanese Office Action mailed Nov. 5, 2013 in corresponding Japanese Application No. 2010-065275.
Japanese Office Action mailed Jan. 28, 2014 in corresponding Japanese Application No. 2010-065275.

* cited by examiner

Primary Examiner — Emerson Puente
Assistant Examiner — Mehran Kamran
(74) Attorney, Agent, or Firm — Staas & Halsey LLP (57) ABSTRACT

A first device that implements one or more first virtual machines and a second device that implements one or more second virtual machines are communicatively connected. The first device notifies the second device being a communication-connection-destination of the first appliance that the first appliance has been connected to the first device. The first device transmits first data received from the second device to the first appliance, and transmits second data received from the first appliance to the second device. The second device notifies the second virtual machine that the first appliance has been connected when the connection is permitted. The second device transmits data received from the first device to the second virtual machine and transmits data received from the second virtual machine to the first device.

17 Claims, 10 Drawing Sheets

VIRTUAL CALCULATING MACHINE SYSTEM, VIRTUAL CALCULATING MACHINE CONTROL APPARATUS AND VIRTUAL CALCULATING MACHINE CONTROL METHOD

CROSS-REFERENCE TO RELATED APPLICATION

This application is based upon and claims the benefit of priority of the prior Japanese Patent Application No. 2010-065275, filed on Mar. 19, 2010, the entire contents of which are incorporated herein by reference.

FIELD

The present invention relates to a virtual calculating machine system, a virtual calculating machine control apparatus, and a virtual calculating machine control method.

BACKGROUND

Normally, dedicated pieces of software are prepared for both a client and a server when a remote operation is performed between the client and the server. By causing the dedicated pieces of software to run in collaboration with each other, the server can be operated from the client, and processing results of the server can be displayed on the client.

For example, with remote operations using a technique such as VNC (Virtual Network Computing), remote desktop or the like, an operation of a keyboard or a mouse connected to a client is notified from the client to a server. Then, the server executes a process as if a keyboard or a mouse connected to the server is operated. Then, the server transmits its output screen to the client. The client displays the output screen of the server on an output screen of the client itself.

In association with the above described technique, a calculating machine system having an I/O device virtualized to allow an I/O device of a server computer to be used from a client computer is known.

Also a process for selectively leading or re-leading an access and a control, which are performed for a USB device connected to the client computer, for the server computer is known.

Patent Document 1: Japanese Laid-open Patent Publication No. 2004-258840
Patent Document 2: Japanese Laid-open Patent Publication No. 2006-195981

SUMMARY

According to one aspect of a virtual calculating machine system, the virtual calculating machine system includes the following components.

The virtual calculating machine system includes a first virtual machine implementing device that implements one or a plurality of first virtual machines by managing hardware resources, and a second virtual machine implementing device that implements one or a plurality of second virtual machines by managing hardware resources. The first virtual machine implementing device and the second virtual machine implementing device are communicatively connected.

The first virtual machine implementing device includes the following components.

An appliance connection detection processing unit detects that a first appliance has been connected.

A connected appliance notification processing unit notifies, based on communication-connection-destination-information indicating a communication-connection-destination of each appliance, the second virtual machine implementing device being a communication-connection-destination of the first appliance that the first appliance has been connected.

A first input/output control unit transmits first data to the first appliance upon receipt of the first data to the first appliance from the second virtual machine implementing device. Moreover, the first input/output control unit transmits second data to the second virtual machine implementing device according to the communication-connection-destination-information upon receipt of the second data from the first appliance.

The second virtual machine implementing device includes the following components.

If identification information of the first virtual machine implementing device is included as the identification information of a device for which the connection is permitted, an authentication processing unit determines, based on the identification information, whether or not to permit a connection for the first virtual machine implementing device notified that the first appliance has been connected. Then, the authentication processing unit notifies the second virtual machine that the first appliance has been connected, when the connection is permitted.

A second input/output control unit transmits the second data to the second virtual machine upon receipt of the second data from the first virtual machine implementing device. Moreover, the second input/output control unit transmits the first data to the first virtual machine implementing device according to the identification information upon receipt of the first data to the first appliance from the second virtual machine.

The object and advantages of the embodiment will be realized and attained by means of the elements and combinations particularly pointed out in the claims.

It is to be understood that both the forgoing general description and the following detailed description are exemplary and explanatory and are not restrictive of the embodiment, as claimed.

DESCRIPTION OF EMBODIMENTS

Figure 1:
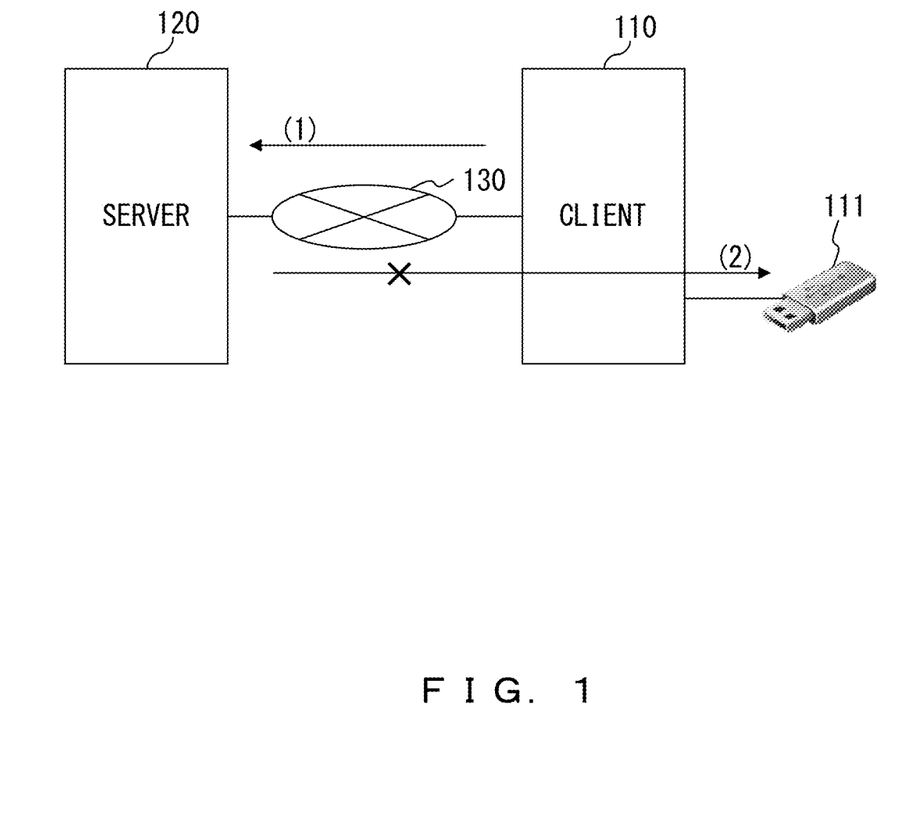
FIG. 1 illustrates an example of a case where a USB memory is connected to a client that is connected to a server via a network.
Figure 2:
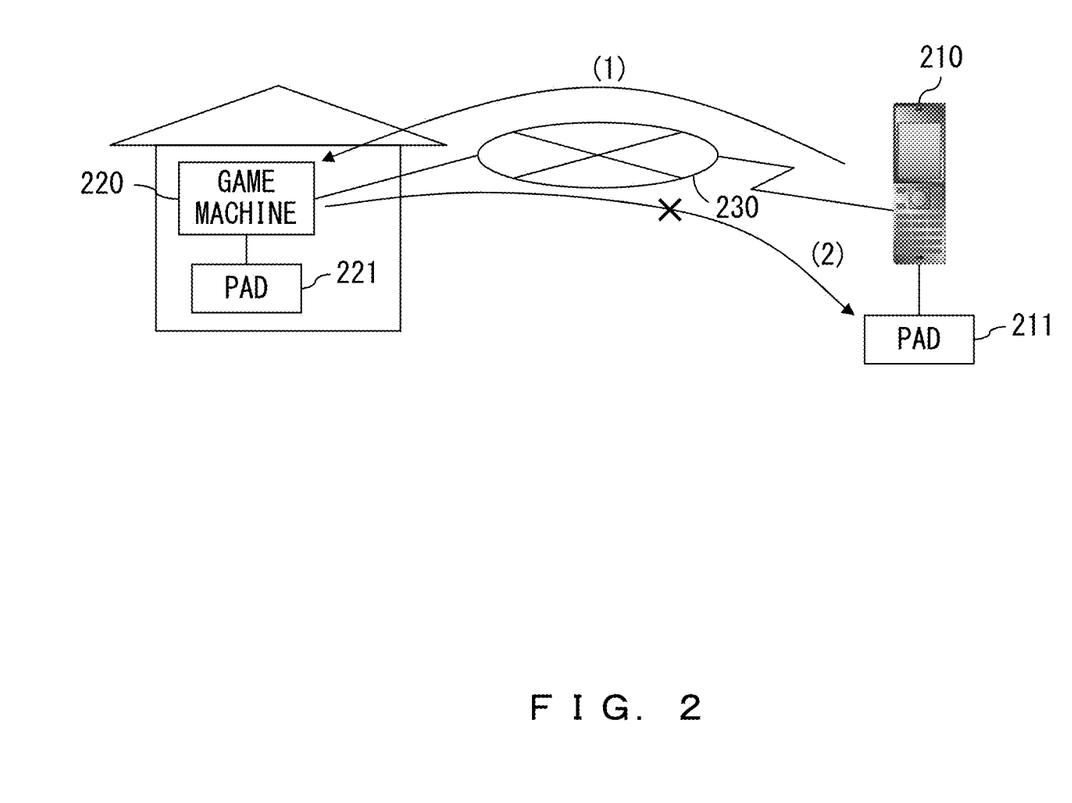
FIG. 2 illustrates an example of a case where a portable terminal device and a game machine to which a game pad used for a game is connected are connected via a network.

As described above, for example, when a server is remotely operated from a client, only peripheral appliances, can be operated from the client. Here, the peripheral appliances are appliances for operating the server, such as a keyboard, a mouse or the like connected to a server. Accordingly, the client cannot make the server operate an appliance connected to the client. This is because the server cannot be made to recognize the appliance connected to the remote client. FIGS. 1 and 2 illustrate a simple example in this case.

FIG. 1 illustrates a case where a USB (Universal Serial Bus) memory 111 is connected to a client 110 that is connected to a server 120 via a network 130.

In this case, a user operates the server 120 from the client 110, and can make the server 120 execute, for example, a program for changing, updating, etc. a blog (Weblog) or an SNS (Social Network Service) site.

However, the server 120 cannot recognize the USB memory 111 connected to the client 110. Accordingly, the user cannot make the server 120 directly read data of photos or the like stored in the USB memory 111 to upload them into a blog or an SNS site.

In this case, the user needs to make the server 120 upload transmitted data of photos or the like after transmitting the data of the photos or the like stored in the USB memory 111 from the client 110 to the server 120.

FIG. 2 illustrates a case where a portable terminal device 210 and a game machine 220 to which a game pad 221 used for a game is connected are connected via a network 230. The portable terminal device 210 has a client function, whereas the game machine 220 has a server function.

In this case, the portable terminal device 210 can operate the game machine 220, and can play a game with the game machine 220.

Although the game pad 211 is connected to the portable terminal device 210, the game machine 220 cannot recognize the game pad 211. Accordingly, a user cannot play a game with the game pad 211. The user plays the game by emulating an operation of the game pad 221 with an operation of a numeric keypad or the like of the portable terminal device 210.

An embodiment is described below with reference to FIGS. 3 to 10.

Figure 3:
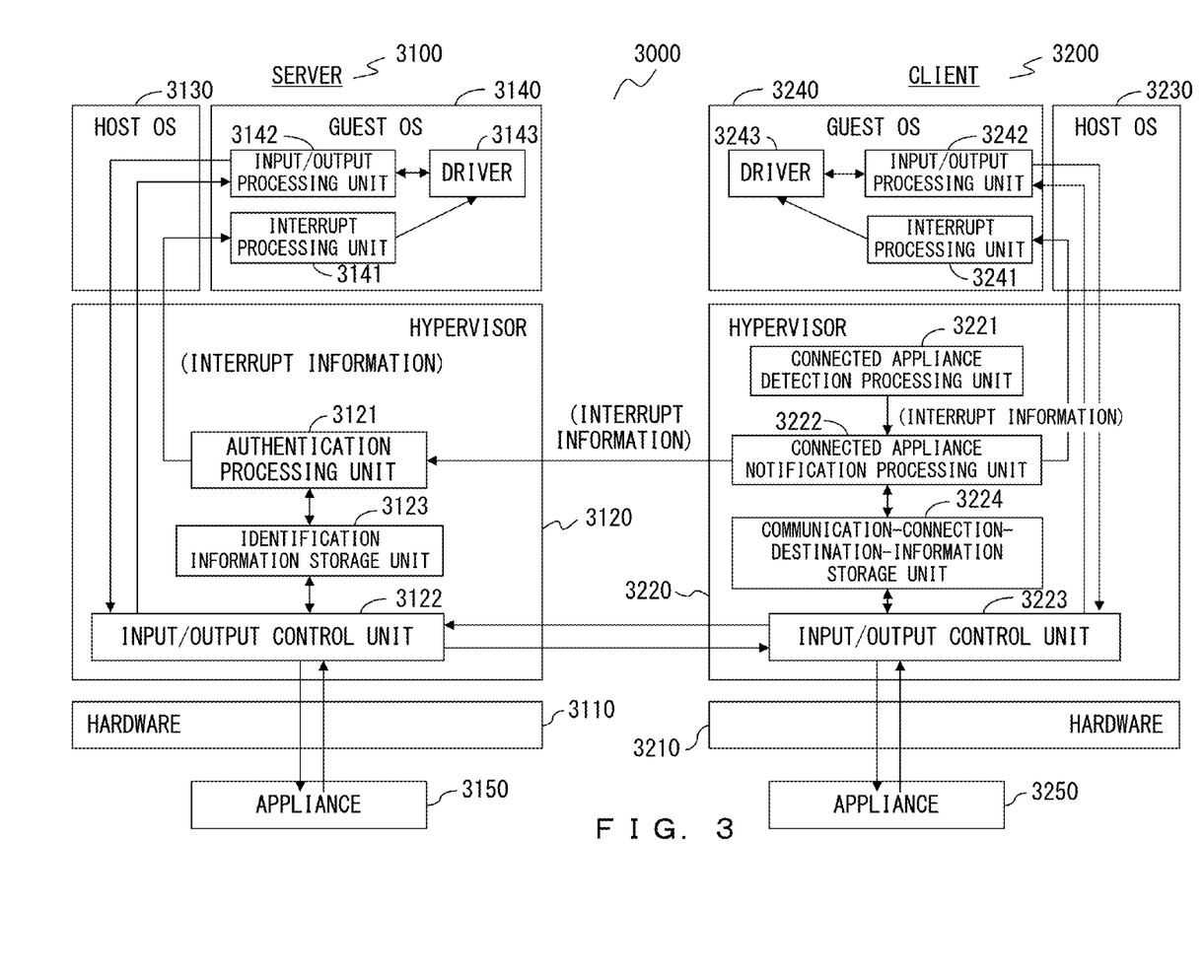
FIG. 3 is an explanatory view of an outline of an information processing system according to an embodiment.

FIG. 3 is an explanatory view of an outline of an information processing system 3000 according to the embodiment.

The information processing system 3000 illustrated in FIG. 3 includes an information processing device 3100 running as a server, and an information processing device 3200 running as a client. The information processing device 3100 and the information processing device 3200 are communicatively connected via the Internet, a dedicated line or the like.

The information processing device 3100 and the information processing device 3200 are hereinafter referred to simply as the server 3100 and the client 3200, respectively.

The server 3100 has hardware 3110 including a CPU 1001, a memory 1002, an input device 1003, an output device 1004, an external storage device 1005, a medium driving device 1006 and a network connecting device 1007, which will be described later with reference to FIG. 10, and other components. The CPU 1001 included in the hardware 3110 executes a predetermined program expanded in the memory 1002, thereby implementing a hypervisor 3120.

The hypervisor 3120 controls the whole of a virtual calculating machine system implemented by the server 3100. For example, the hypervisor 3120 provides a VM (Virtual Machine) where a host OS (Operating System) 3130 and a guest OS 3140 run. The hypervisor 3120 executes processes such as a dispatch process of each OS, emulates a privilege instruction executed by each OS, and performs a hardware control for the CPU. FIG. 3 illustrates the case where one guest OS is used. However, FIG. 3 is not intended to limit the number of guest OSes.

Here, the hypervisor 3120 includes an authentication processing unit 3121 and an input/output control unit 3122. In FIG. 3, an identification information storage unit 3123 is illustrated in the hypervisor 3120. However, this is intended for ease of understanding, and not intended to represent that the identification information storage unit 3123 is essential to the configuration of the hypervisor 3120. Identification information 400 will be described later with reference to FIG. 4.

Figure 6:
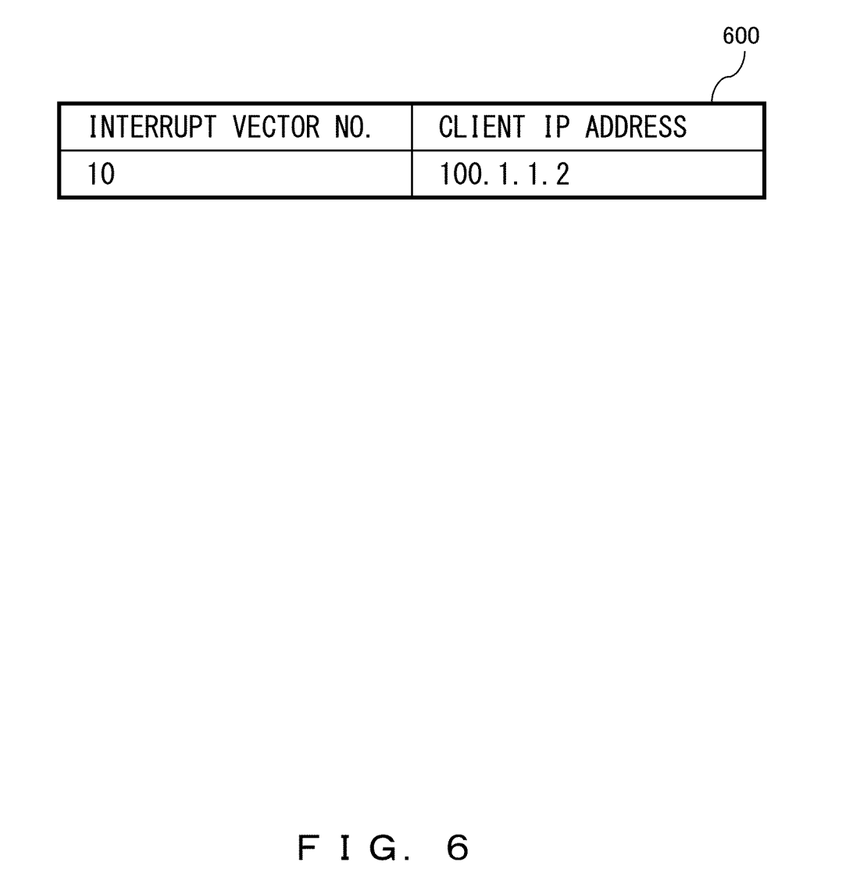
FIG. 6 illustrates an example of interrupt information in the embodiment.

Upon receipt of interrupt information 600 transmitted from a client, the authentication processing unit 3121 verifies whether or not the client that has transmitted the interrupt information 600 is registered to the identification information 400 stored in the identification information storage unit 3123. Then, the authentication processing unit 3121 gives connection permission to a client registered to the identification information storage unit 3123. Upon giving the connection permission, the authentication processing unit 3121 notifies the guest OS 3140 of the interrupt information 600. The interrupt information 600 is illustrated in FIG. 6.

The input/output control unit 3122 controls accesses from the host OS 3130 and the guest OS 3140 to an appliance. The appliance connected to the server 3100 is referred to as an appliance 3150, whereas an appliance connected to the client 3200 is referred to as an appliance 3250.

For example, when the guest OS 3140 receives data transmitted to the appliance 3250 registered to the identification information 400, the input/output control unit 3122 transmits the received data to the client 3200 registered to the identification information 400.

Additionally, when the guest OS 3140 receives data transmitted to an appliance 3150 that is not registered to the identification information 400, the input/output control unit 3122 transmits the received data to an appliance 3150 that is connected to the server 3100 and corresponds to the appliance 3250. "Correspond to" is to recognize an OS as the similar one or the similar type from the host OS 3130 or the guest OS 3140.

Furthermore, for example, upon receipt of data from the client 3200 to a guest OS 3140, the input/output control device 3122 transmits the data to the specified guest OS 3140.

The identification information storage unit 3123 is a storage device for storing the identification information 400 in which a unique identifier, such as a MAC address or an IP address, of a client that gives permission for a communication connection is registered for each appliance. The identification information storage unit 3123 can be implemented, for example, with the memory 1002, the external storage device 1005 or the like included in the hardware 3110.

In the virtual calculating machine system according to the embodiment, a known OS can be used as the host OS 3130 and the guest OS 3140. Accordingly, diverse known techniques can be used for the host OS 3130 and the guest OS 3140. Only outlines of the host OS 3130 and the guest OS 3140 are described below.

The host OS 3130 is an OS running in a VM provided by the hypervisor 3120. The host OS 3130 is automatically activated by the hypervisor 3120 upon activation of the hypervisor 3120.

Additionally, the host OS 3130 operates and manages the entire virtual calculating machine system. For example, the host OS 3130 controls activation, deactivation and the like of the guest OS 3140. Moreover, the host OS 3130 manages hardware resources (such as the CPU, the memory, I/O and the like) allocated to the guest OS 3140. Furthermore, the host OS 3130 transmits an I/O instruction executed by the guest OS 3140 to a real I/O device.

Also the guest OS 3140 is an OS running in the VM provided by the hypervisor 3120 as well as the host OS 3130. The guest OS 3140 is activated by the host OS 3130. The guest OS 3140 accesses the real I/O device via the host OS 3130. In this case, a virtual I/O device is allocated to the guest OS 3140.

The guest OS 3140 includes an interrupt processing unit 3141, an input/output processing unit 3142 and the like.

For example, upon receipt of a notification of the interrupt information 600 from the authentication processing unit 3121, the interrupt processing unit 3141 executes a predetermined process according to an interrupt vector number included in the interrupt information 600.

For example, the interrupt processing unit 3141 accesses an appliance identified with the interrupt vector number included in the interrupt information 600 via the input/output processing unit 3142, and obtains information about the appliance such as the USB memory. Then, the interrupt processing unit 3141 activates a driver 3143 used to operate the appliance. Moreover, the interrupt processing unit 3141 registers the appliance to device information for holding information about a device configuration of the guest OS 3140. Thereafter, the guest OS 3140 can access the appliance by using the driver 3143.

The client 3200 has hardware 3210 including the CPU 1001, the memory 1002, the input device 1003, the output device 1004, the external storage device 1005, the medium driving device 1006 and the network connecting device 1007, which will be described later with reference to FIG. 10, and other components similarly to the server 3100. The CPU 1001 included in the hardware 3210 executes a predetermined program expanded in the memory 1002 to implement a hypervisor 3220.

Figure 10:
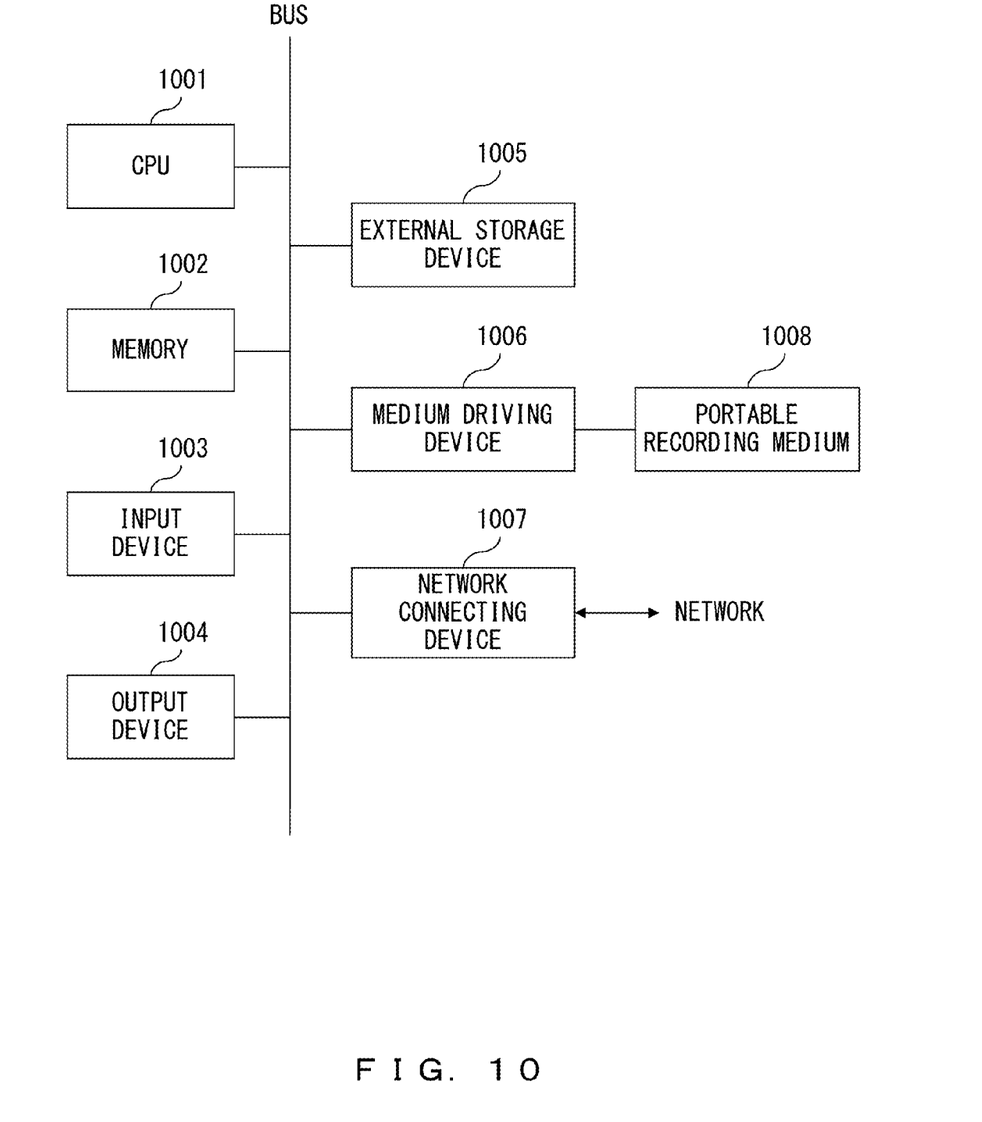
FIG. 10 illustrates a configuration example of the server and the client in the embodiment.

In this embodiment, hardware common to the hardware 3110 comprised by the server 3100 and the hardware 3210 comprised by the client 3200 is described by using the hardware illustrated in FIG. 10. However, this does not mean that the hardware 3110 and the hardware 3210 have the same configuration. This is not intended to limit, for example, the hardware 3110 and the hardware 3210 to a configuration including the same CPU, memory and the like.

The hypervisor 3220 provides a VM where the host OS 3230 and the guest OS 3240 run, and emulates a privilege instruction executed by the host OS 3230 or the guest OS 3240. FIG. 3 illustrates the case where one guest OS is used. However, FIG. 3 is not intended to limit the number of guest OSes.

The hypervisor 3220 controls the whole of the virtual calculating machine system implemented by the client 3200. For example, the hypervisor 3220 provides the VM where the host OS 3230 and the guest OS 3240 run. Moreover, the hypervisor 3220 executes processes such as a dispatch process of each OS, emulates a privilege instruction executed by each OS, and performs a hardware control for the CPU. FIG. 3 illustrates the case of one guest OS. However, FIG. 3 is not intended to limit the number of guest OSes.

Here, the hypervisor 3220 includes a connected appliance detection processing unit 3221, a connected appliance notification processing unit 3222, and an input/output control unit 3223. In FIG. 3, a communication-connection-destination-information storage unit 3224 is illustrated in the hypervisor 3220. However, this is intended for ease of understanding, and not intended to represent that the communication-connection-destination-information storage unit 3224 is essential to the configuration of the hypervisor 3220.

The connected appliance detection processing unit 3221 detects that an appliance 3250 has been connected to the client 3200. Then, the connected appliance detection processing unit 3221 notifies, along with the interrupt information 600, the connected appliance notification processing unit 3222 that the appliance has been connected to the client 3200.

The connected appliance notification processing unit 3222 determines a communication-connection-destination according to communication-connection-destination-information 500 to be described later with reference to FIG. 5. Then, the connected appliance notification processing unit 3222 notifies the determined communication-connection-destination of the interrupt information 600.

For example, if the communication-connection-destination is the server 3100, the connected appliance notification processing unit 3222 notifies the server 3100 of the interrupt information 600. In this case, the connected appliance notification processing unit 3222 adds an IP address of the client 3200 to the interrupt information 600. Moreover, if a server is not set as the communication-connection-destination, the connected appliance notification processing unit 3222 notifies the guest OS 3240 of the client 3200 of the interrupt information 600.

The input/output control unit 3223 controls accesses from the guest OS 3240 and the host OS 3230 to an appliance.

For example, upon receipt of data from the connected appliance 3250, the input/output control unit 3223 transmits the data to the communication-connection-destination set in the communication-connection-destination-information 500. For example, if the server 3100 is registered as the communication connection destination of the connected appliance 3250 in the communication-connection-destination-information 500, the input/output control unit 3223 transmits the data to the server 3100. Alternatively, if no server is set as the communication-connection-destination in the communication-connection-destination-information 500, the input/output control unit 3223 transmits the data to the guest OS 3240.

Additionally, for example, upon receipt of data from the server 3100 to the appliance 3250, the input/output control unit 3223 transmits the data to a specified appliance 3250.

The communication-connection-destination-information storage unit 3224 is a storage device for storing the communication-connection-destination-information 500 to which a communication-connection-destination is registered for each appliance connected to the client 3200. The communication-connection-destination-information storage unit 3224 can be implemented, for example, with the memory 1002, the external storage device 1005 or the like included in the hardware 3210. The communication connection destination information 500 will be described later with reference to FIG. 5.

In the virtual calculating machine system according to the embodiment, a known OS can be used as the host OS 3230 and the guest OS 3240 similarly to the host OS 3130 and the guest OS 3140. Accordingly, diverse known techniques can be used for the host OS 3230 and the guest OS 3240.

Figure 4:
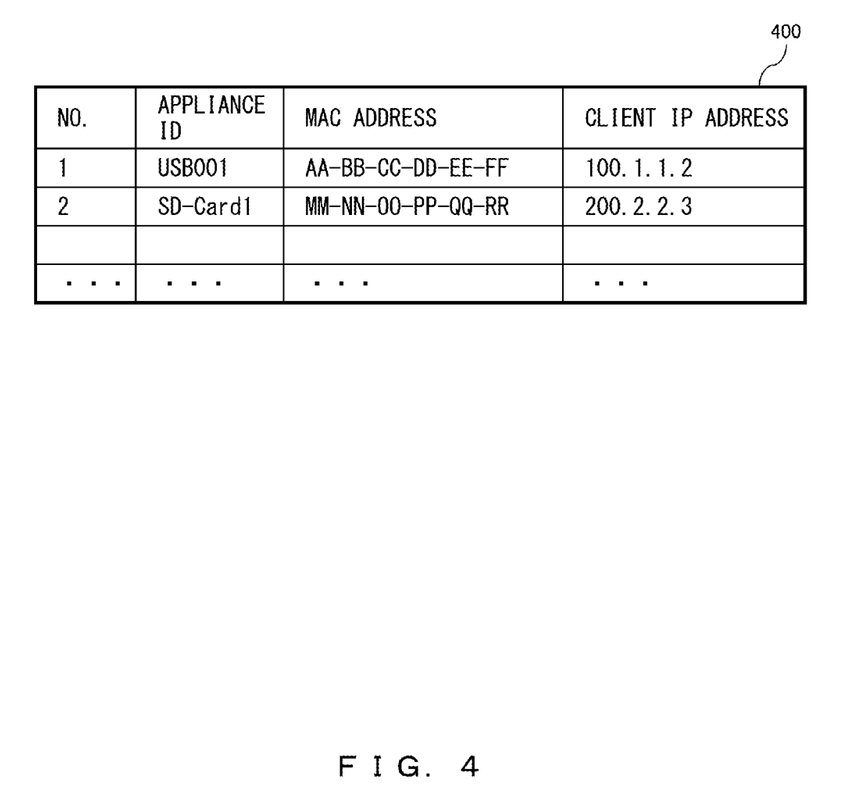
FIG. 4 illustrates an example of identification information in the embodiment.

FIG. 4 illustrates an example of the identification information 400 in this embodiment.

The identification information 400 illustrated in FIG. 4 includes, in order of registrations, a registration number, an appliance ID of an appliance connected to a registered client, a MAC (Media Access Control) address and an IP address of the registered client.

The identification information 400 can be preset. Moreover, the hypervisor 3120 may be provided with a function of making a user specify a communication-connection-destination via the input device 1003 upon receipt of the interrupt information 600 from the client 3200.

Figure 5:
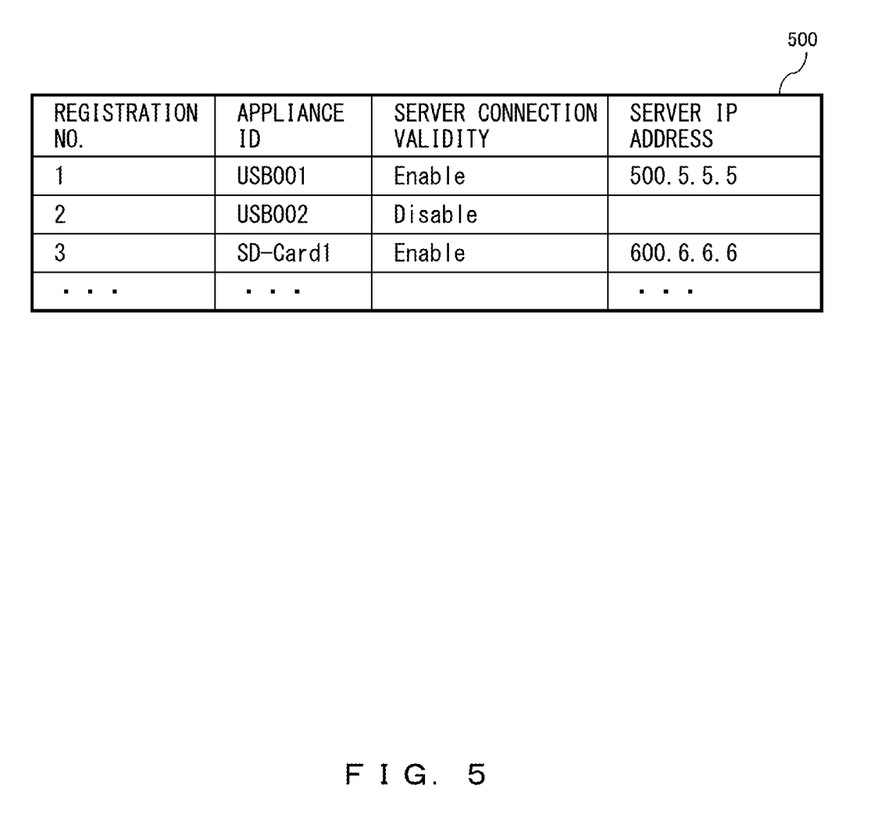
FIG. 5 illustrates an example of communication-connection-destination-information in the embodiment.

FIG. 5 illustrates an example of the communication-connection-destination-information 500 in this embodiment.

The communication-connection-destination-information 500 illustrated in FIG. 5 includes, in order of registrations, a registration number, an appliance ID that is the identification information 400 of a registered appliance, validity of a communication connection to a server, and an IP address of the server at a communication-connection-destination. If the server 3100 configures the virtual calculating machine system as in this embodiment, the IP address registered to the communication-connection-destination-information 500 is an IP address assigned to each server running in the virtual calculating machine system.

For the server connection validity, for example, "Enabled" or "Disabled" can be set. If "Enabled" is set in the server connection validity, a server indicated by an IP address becomes a communication-connection-destination. If "Disabled" is set in the server connection validity, the guest OS 3240 of the client 3200 becomes a communication-connection-destination.

The communication-connection-destination-information 500 can be preset. Moreover, the hypervisor 3220 may be provided with a function of making a user specify a communication-connection-destination via the input device 1003 upon detecting that an appliance has been connected to the client 3200.

To the communication-connection-destination-information 500, a plurality of servers can be registered as communication-connection-destinations for the same appliance. In this case, for example, the hypervisor 3220 may be provided with a function of making a user select a communication connection destination by displaying candidates of communication-connection-destination on display means such as a display unit or the like.

FIG. 6 illustrates an example of the interrupt information 600 in the embodiment.

The interrupt information 600 illustrated in FIG. 6 includes an interrupt vector number that indicates an interrupt type. However, as illustrated in FIG. 6, an IP address of the client 3200 is added to the interrupt information 600 when the interrupt information 600 is transmitted from the client 3200 to the server 3100.

Figure 7:
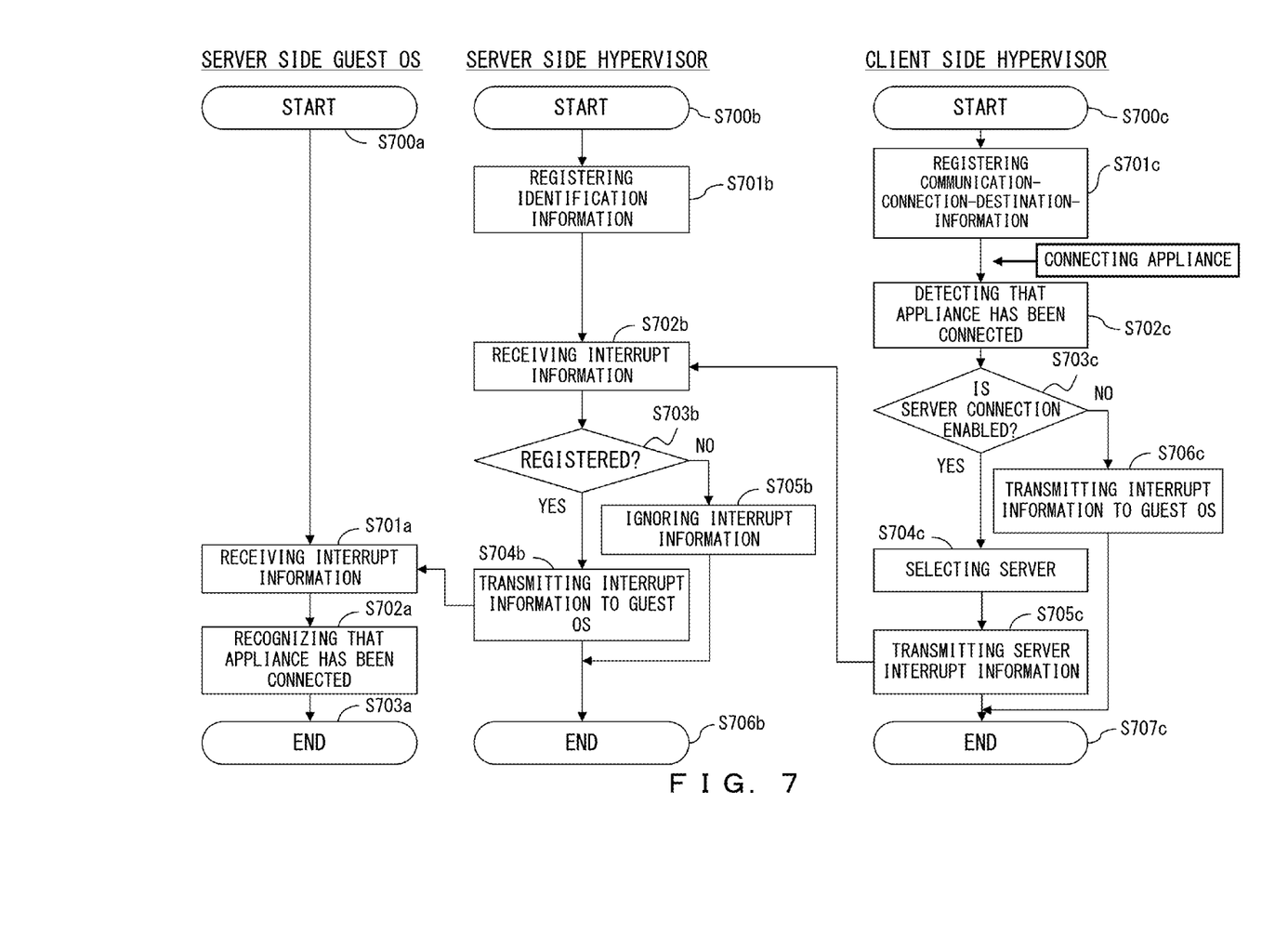
FIG. 7 is a flowchart illustrating a process executed when an appliance is connected to a client of the information processing system according to the embodiment.

FIG. 7 is a flowchart illustrating a process for connecting an appliance 3250 when the appliance is connected to the client 3200 of the information processing system 3000 according to the embodiment.

In the server 3100, the hypervisor 3120 makes registration to the identification information 400, for example, at the time of initial settings after the hypervisor 3120 is activated, or according to a request from a user (step S701b). The registration to the identification information 400 may be made in advance.

In the client 3200, the hypervisor 3220 makes registration to the communication-connection-destination-information 500, for example, at the time of initial settings after the hypervisor 3220 is activated, or according to a request from a user (step S701c). The registration to the communication connection destination information 500 may be made in advance.

Here, a case where an appliance 3250 is connected to the client 3200 is considered.

If the appliance 3250 has been connected to the client 3200, the connected appliance detection processing unit 3221 detects the connection of the appliance 3250 based on an interrupt signal or the like from the hardware 3210 in step S702c. Then, the connected appliance notification processing unit 3222 references the communication-connection-destination-information 500 stored in the communication-connection-destination-information storage unit 3224 to obtain a communication-connection-destination of the appliance 3250.

If servers for which "Enabled" is set in the server connection validity are registered to the communication connection destination information 500 in step S703c ("YES" in step S703c), the connected appliance notification processing unit 3222 selects one of the plurality of servers for which "Enabled" is set in the server connection validity (step S704c).

For example, the connected appliance notification processing unit 3222 displays, on display means such as a display unit or the like, the plurality of servers for which "Enabled" is set in the server connection validity in the communication-connection-destination-information 500 as candidates for selecting the communication-connection-destination of the appliance 3250, and prompts a user to select the communication-connection-destination of the appliance 3250. Then, the connected appliance notification processing unit 3222 selects the server specified by the user as the communication-connection-destination of the appliance 3250.

If the number of servers for which "Enabled" is set in the server connection validity is one in the communication-connection-destination-information 500, the connected appliance notification processing unit 3222 selects the server for which "Enabled" is set in the server connection validity as the communication-connection-destination of the appliance 3250.

In step S705c, the connected appliance notification processing unit 3222 transmits the interrupt information 600 to the selected server in step S704c. At the time of this transmission, the connected appliance notification processing unit 3222 adds an IP address of the client 3200 to the interrupt information 600.

If no server for which "Enabled" is set in the server connection validity is registered to the communication-connection-destination-information 500 ("NO" in step S703c), the connected appliance notification processing unit 3222 transmits the interrupt information 600 to the guest OS 3230 of the client 3200 (step S706c). Also if no server is registered to the communication-connection-destination-information 500 ("NO" in step S703c), the connected appliance notification processing unit 3222 transmits the interrupt information 600 to the guest OS 3230 of the client 3200 (step S706c).

In the server 3100, the hypervisor 3120 receives the interrupt information 600 transmitted from the client 3200 (step S702b). Then, the authentication processing unit 3121 references the identification information 400 stored in the identification information storage unit 3123. If the client 3200 that has transmitted the interrupt information 600 is not registered to the identification information 400 ("NO" in step S703b), the authentication processing unit 3121 ignores the transmitted interrupt information 600 (step S705b).

Alternatively, if the client 3200 that has transmitted the interrupt information 600 is registered to the identification information 400 ("YES" in step S703*b*), the authentication processing unit 3121 transmits the interrupt information 600 to the guest OS 3140 of the server 3100 (step S704*b*). For example, the authentication processing unit 3121 transmits the interrupt information 600 to the guest OS 3140 based on an interrupt from an arbitrary I/O port A of the VM provided by the hypervisor 3120.

In step S701*a*, the guest OS 3140 receives the interrupt information 600 from the hypervisor 3120. Then, the guest OS 3140 recognizes the connected appliance 3250 (step S702*a*).

Figure 8:
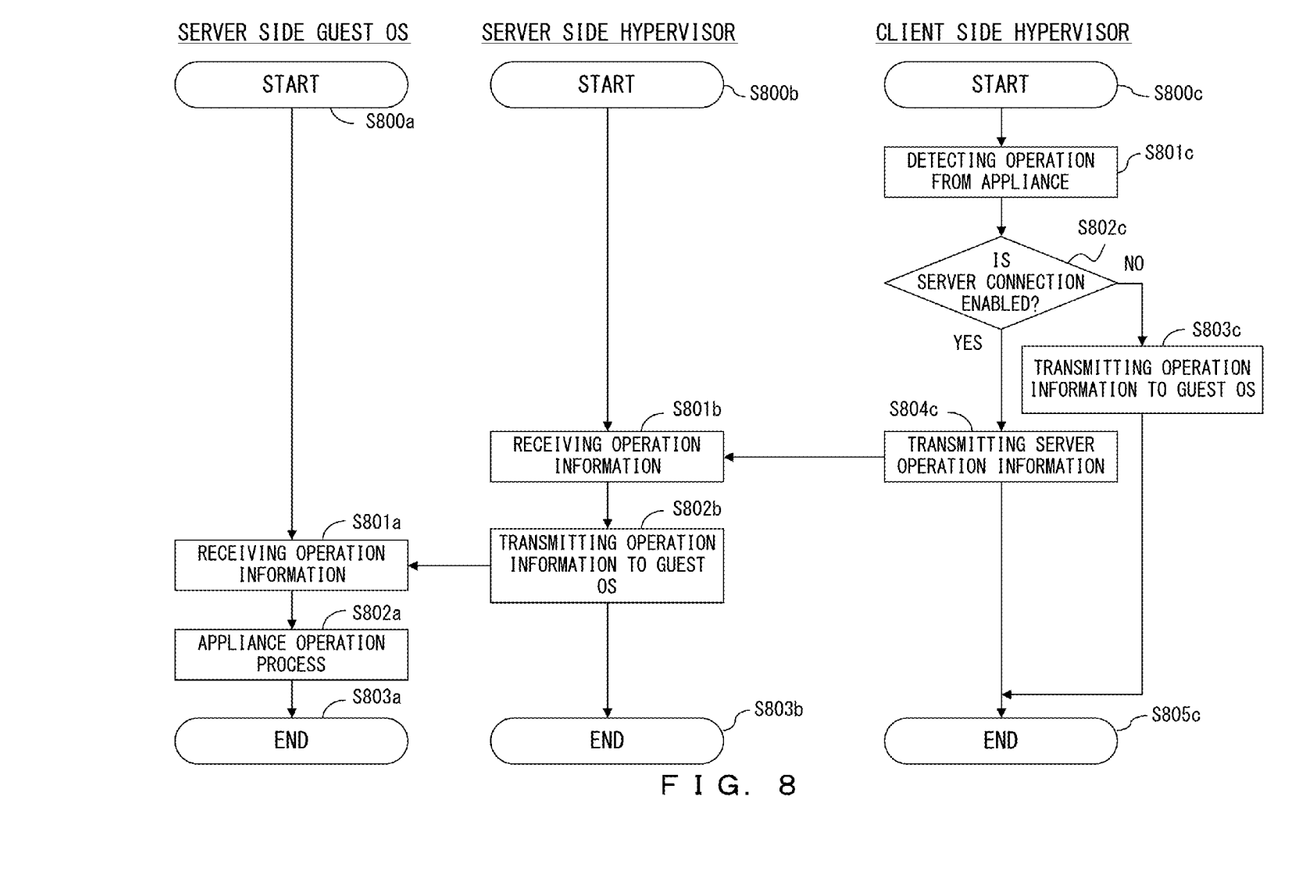
FIG. 8 is a flowchart illustrating a process for operating a guest OS of a server from an appliance connected to the client of the information processing system according to the embodiment.
Figure 9:
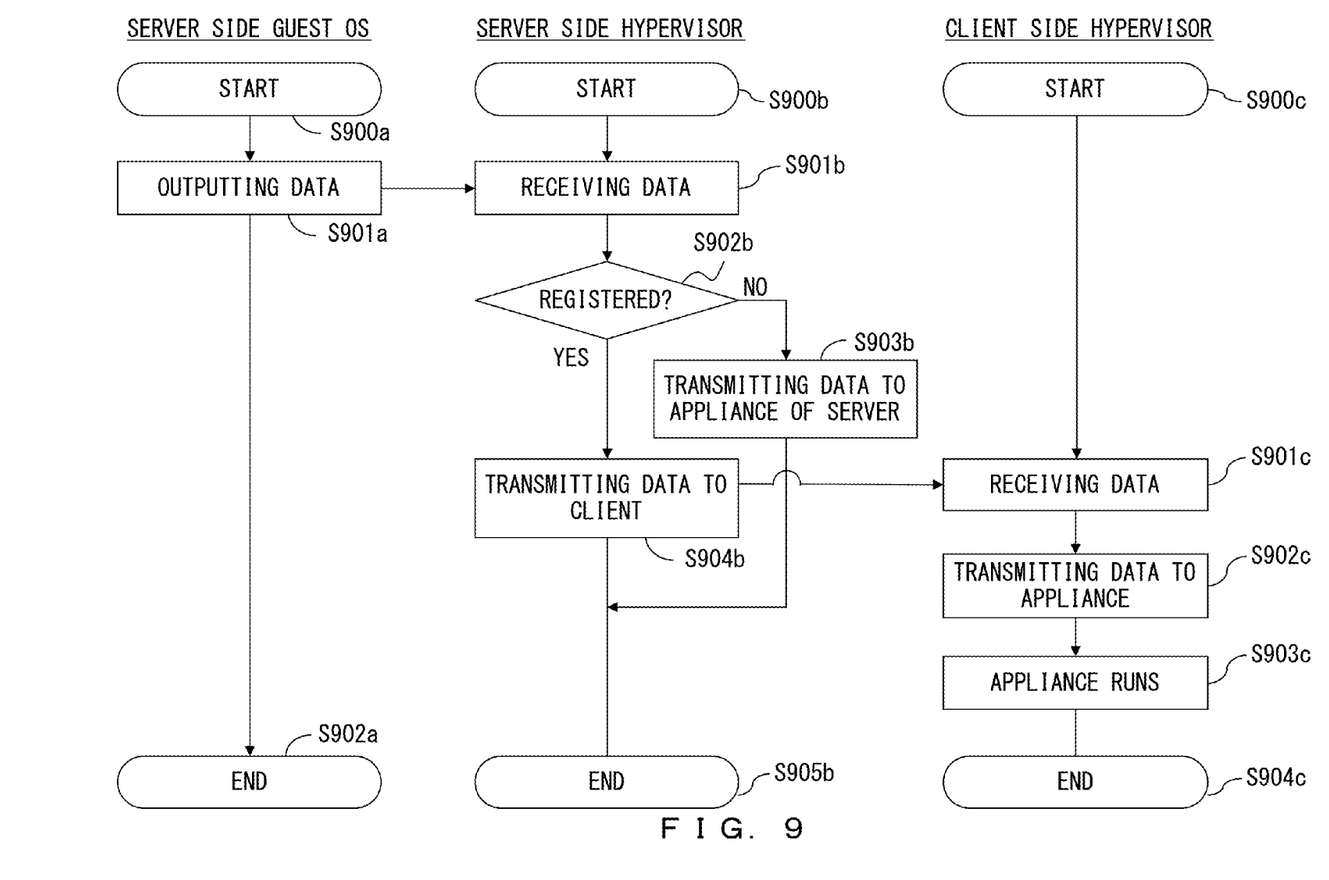
FIG. 9 is a flowchart illustrating a process for transmitting data to the appliance connected to the client from the guest OS of the server of the information processing system according to the embodiment.

For example, the guest OS 3140 accesses the appliance 3250 identified with the interrupt information 600 according to the processes illustrated in FIGS. 8 and 9 as occasion demands upon receipt of the interrupt information 600 from the hypervisor 3120. Then, the guest OS 3140 obtains information about the appliance 3250. Then, the guest OS 3140 activates a driver used to operate the appliance 3250 based on the obtained information. Moreover, the guest OS 3140 registers the appliance 3250 to device information for holding information about an appliance configuration of the guest OS 3140.

Thereafter, the guest OS 3140 can access the appliance 3250 by using the driver. For example, since the hypervisor 3120 notifies the connection of the appliance 3250 based on an interrupt from an arbitrary I/O port A of the VM provided by the hypervisor 3120, the guest OS 3140 recognizes that the appliance 3250 has been connected to the I/O port A.

Upon completion of the above described process, the appliance connection process is terminated (steps S703*a*, S706*b* and S707*c*).

FIG. 8 is a flowchart illustrating a process executed when the appliance 3250 connected to the client 3200 of the information processing system 3000 according to the embodiment operates the guest OS 3140 of the server 3100.

The process illustrated in FIG. 8 is also applicable to a process executed when the guest OS 3140 of the server 3100 obtains information such as data or the like from the appliance 3250 connected to the client 3200. In this case, not operation information but the information such as the data or the like is transmitted from the appliance 3250 to the guest OS 3140.

In step S801*c*, when a user operates the appliance 3250 connected to the client 3200, the input/output control unit 3223 detects the operation of the appliance 3250. Then, the input/output control unit 3223 references communication-connection-destination-information 500 stored in the communication-connection-destination-information storage unit 3224. Then, the input/output control unit 3223 verifies whether or not "Enabled" is set in the server connection validity for the appliance 3250.

If "Enabled" is not set in the server connection validity for the appliance 3250 in step S802*c* ("NO" in step S802*c*), the input/output control unit 3223 notifies the guest OS 3240 of the client 3200 of the operation information of the appliance 3250 (step S803*c*).

In this embodiment, "operation information" is information about an operation that a user performs for the appliance 3250, or information about an instruction of a process executed with an operation. For example, the operation information is information about an operation performed for a numeric keypad comprised by the appliance 3250. This operation information may include information about an operation performed for the appliance 3250 and intended to operate the guest OS 3140 of the server 3100, or information about an instruction of a process executed with an operation.

If "Enabled" is set in the server connection validity for the appliance 3250 ("YES" in step S802*c*), the input/output control unit 3223 transmits the operation information of the appliance 3250 to the server 3100 already selected in step S704*c* of FIG. 7 (step S804*c*).

In the server 3100, the input/output control unit 3122 receives the operation information transmitted from the client 3200 (step S801*b*). Then, the input/output control unit 3122 references the identification information 400 stored in the identification information storage unit 3123. Then, the input/output control unit 3122 transmits the operation information to the guest OS 3140 identified with the transmission-destination-information, namely, an IP address received along with the operation information (step S802*b*). At this time, for example, the input/output control unit 3122 transmits the operation information of the appliance 3250 to the guest OS 3140 via the particular I/O port A of the VM provided by the hypervisor 3120.

In step S801*a*, the guest OS 3140 receives the operation information from the hypervisor 3120. Then, the guest OS 3140 executes a process according to the operation information (step S802*a*).

Upon completion of the above described process, the process of the operation performed from the appliance 3250 connected to the client 3200 is terminated (step S803*a*, S803*b*, S805*c*).

Here, for example, a case where image data and the like held by the appliance 3250 connected to the client 3200 is loaded into a home page or the like by operating an application running on the guest OS 3140 of the server 3100 is considered.

In this case, when a user operates the appliance 3250, such as a numeric keypad or the like, connected to the client 3200, the operation information is transmitted to the guest OS 3140 of the server 3100 according to the process illustrated in FIG. 8.

Then, the guest OS 3140 of the server 3100 requests the appliance 3250, such as the USB memory or the like, connected to the client 3200 to transmit image data or the like according to the operation information. The image data or the like held in the appliance 3250 such as the USB memory or the like is transmitted to the guest OS 3140 of the server 3100 according to the process illustrated in FIG. 8.

Then, the guest OS 3140 of the server 3100 uploads the obtained image data or the like into the home page or the like according to the operation information.

FIG. 9 is a flowchart illustrating a process for transmitting data such as image data or the like from the guest OS 3140 of the server 3100 of the information processing system 3000 according to the embodiment to the appliance 3250 connected to the client 3200.

The process illustrated in FIG. 9 is also applicable to a process for transmitting the operation information from the guest OS 3140 of the server 3100 to the appliance 3250 connected to the client 3200. In this case, not data such as the image data or the like but the operation information is transmitted from the guest OS 3140 to the appliance 3250.

In step S901*a*, the guest OS 3140 outputs data to the appliance 3250. Since the guest OS 3140 recognizes, for example, that the appliance 3250 is connected to the particular I/O port A of the VM provided by the hypervisor 3120, the guest OS 3140 outputs the data to the I/O port A of the VM provided by the hypervisor 3120.

In step S901*b*, the input/output control unit 3122 receives the data output from the host OS 3130. Then, the input/output control unit 3122 references the identification information 400 stored in the identification information storage unit 3123.

If the client 3200 at the communication-connection-destination of the appliance 3250 is not registered to the identification information 400 ("NO" in step S902b), the input/output control unit 3122 transmits the data to the appliance 3150 connected to the server 3100 (step S903b).

Alternatively, if the client 3200 at the communication-connection-destination of the appliance 3250 is registered to the identification information 400 ("YES" in step S902b), the input/output control unit 3122 transmits the data to the client 3200 registered to the identification information 400 (step S904b).

In the client 3200, the hypervisor 3220 receives the data transmitted from the server 3100 (step S901c). Then, the input/output control unit 3223 transmits the data to the specified appliance 3250 along with the data transmitted from the server 3100 (step S903c). The appliance 3250 receives the transmitted data, and executes processes such as a process for storing the received data at a predetermined address (step S904c).

FIG. 10 illustrates a configuration example of the server 3100 and the client 3200 in the embodiment. The same configuration can be used as the server 3100 and the client 3200 in the embodiment. The configuration is described below by taking, as an example, a case of the server 3100. However, this is not intended to limit the configurations of the server 3100 and the client 3200 to the same configuration.

Hardware 3110 of the server 3100 illustrated in FIG. 10 includes the CPU 1001, the memory 1002, the input device 1003, the output device 1004, the external storage device 1005, the medium driving device 1006 and the network connecting device 1007. These devices are interconnected by a bus, and mutually exchange data.

The CPU 1001 is a device for executing a program for implementing the hypervisor 3120 in the embodiment in addition to the operation of peripheral devices or the execution of various types of software. The memory 1002 is a device for storing an arbitrary program and the like. As the memory 1002, for example, a volatile memory such as a RAM (Random Access Memory) or the like can be used.

The input device 1003 is a device for externally inputting data. For example, a keyboard, a mouse or the like can be used as the input device 1003. The output device 1004 is a device for outputting and displaying data and the like on display means such as a display unit or the like.

The external storage device 1005 is a device for recording a program for implementing the hypervisor 3120 according to the embodiment in addition to a program and data, which are used by the server 3100 to run. For example, a magnetic disk device or the like can be used as the external storage device 1005.

The medium driving device 1006 is a device for outputting data of the memory 1002 or the external storage device 1005 onto a portable recording medium 1008, or for reading a program, data and the like from the portable recording medium 1008. For example, a floppy disk, an MO disk, a CD-R, a DVD-R and the like can be used as the portable recording medium 1008.

The network connecting device 1007 is a device for making a connection to a network.

As described above, when the appliance 3250 is connected to the client 3200, if the appliance 3250 is registered to the communication-connection-destination-information 500 and "Enabled" is set in server connection validity, the hypervisor 3220 transmits interrupt information to the server 3100 for which "Enabled" is set in the server connection validity.

In the meantime, the hypervisor 3120 running on the server 3100 notifies the guest OS 3140 of interrupt information upon receipt of the interrupt information from the server 3100 registered to the identification information 400. At this time, the interrupt information is notified to the guest OS 3140 based on, for example, an interrupt from an arbitrary I/O port of the VM provided by the hypervisor 3120. Accordingly, the OS 3140 recognizes that the appliance 3250 has been connected to the I/O port of the server 3100, and performs operations to operate the appliance 3250, such as an operation for activating a predetermined driver, thereby enabling an access to the appliance 3250.

As a result, the server 3100 can be made to operate the appliance 3250 comprised by the client 3200 that accesses the server 3100.

For example, if a predetermined operation is performed from the client 3200 to the OS 3140 running on the server 3100, the OS 3140 can access the appliance 3250 as follows. The following data includes operation information in addition to mere data. As a matter of course, the appliance 3250 can access the OS 3140 similarly.

Upon detection of a data transmission from the guest OS 3140 to the appliance 3250 registered to the identification information 400, the hypervisor 3120 running on the server 3100 transmits the data to the client 3200 identified with a unique identifier registered to the identification information 400.

Additionally, upon receipt of data to the appliance 3250 registered to the communication-connection-destination-information 500, the hypervisor 3220 running on the client 3200 transmits the received data to the appliance 3250.

In the meantime, upon receipt of data from the appliance 3250 registered to the communication-connection-destination-information 500, the hypervisor 3220 running on the client 3200 transmits the data to the server 3100 for which "Enabled" is set in the server connection validity.

Additionally, upon receipt of data from the client 3200 registered to the identification information 400, the hypervisor 3120 transmits the received data to the guest OS 3140.

Accordingly, for example, software running on the guest OS 3140 of the server 3100 is operated with the appliance 3250 connected to the client 3200 at a remote site, and the appliance 3250 connected to the client 3200 at the remote site can be operated from the software.

For the virtual calculating machine system according to the embodiment, existing configurations can be used other than the hypervisor 3120 and the hypervisor 3220. For example, there is no need to change the hardware 3110 and 3210, the host OSes 3130 and 3230, the guest OSes 3140 and 3240, or the like. This produces an effect of allowing the virtual calculating machine system according to the embodiment to be easily implemented.

The server 3100 according to the embodiment accepts interrupt information only from the client 3200 registered to the identification information 400, thereby producing an effect of allowing security to be maintained.

In the above described information processing system 3000, the host OS 3230 or the guest OS 3240 can be cited as one example of a first virtual machine. Moreover, the host OS 3130 or the guest OS 3140 can be cited as one example of a second virtual machine.

The client 3200 can be cited as one example of a first virtual machine implementing device. Moreover, the server 3100 can be cited as one example of a second virtual machine implementing device.

As described above, with the disclosed virtual calculating machine system, a server can operate an appliance comprised by a client that accesses the server.

The process procedures represented by the flowcharts in FIGS. 7 to 9 are not intended to limit the order of processes. Accordingly, if possible, the order of processes can be changed as a matter of course.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A virtual calculating machine system comprising:
    a first virtual machine implementing device that implements one or a plurality of first virtual machines by managing hardware resources, and
    a second virtual machine implementing device that implements one or a plurality of second virtual machines by managing hardware resources, and that is communicatively connected to the first virtual machine implementing device, wherein,
    the first virtual machine implementing device includes
        an appliance connection detection processing unit to detect that a first appliance has been connected to the first virtual machine implementing device,
        a connected appliance notification processing unit to notify, using communication-connection-destination-information indicating a communication-connection-destination of each appliance, the second virtual machine implementing device being a communication-connection-destination of the first appliance that the first appliance has been connected, and
        a first input and output control unit to transmit first data to the first appliance upon receipt of the first data to the first appliance from the second virtual machine implementing device, and to transmit second data to the second virtual machine implementing device according to the communication-connection-destination-information upon receipt of the second data from the first appliance; and
    the second virtual machine implementing device includes
        an authentication processing unit to determine, using identification information, whether to permit a connection for the first virtual machine implementing device notified that the first appliance has been connected when identification information of the first virtual machine implementing device is included as the identification information of a device for which the connection is permitted, and to notify the second virtual machine that the first appliance has been connected when the connection is permitted, and
        a second input and output control unit to transmit the second data to the second virtual machine according to the identification information upon receipt of the second data from the first appliance of the first virtual machine implementing device, and to, upon receipt of the first data to the first appliance of the first virtual machine implementing device from the second virtual machine, transmit the first data to the first appliance of the first virtual machine implementing device according to the identification information, wherein when connection validity of the second virtual machine implementing device is set to "Disabled" in the identification information included in the communication-connection-destination-information, the first input and output control unit transmits the second data to the first virtual machine, when the connection validity of the second virtual machine implementing device is set to "Enabled", the first input and output control unit transmits to the second virtual machine implementing device interrupt information indicating that the first appliance is connected.

2. The virtual calculating machine system according to claim 1, wherein
    when the identification information includes the identification information of the first virtual machine implementing device notified that the first appliance has been connected, the authentication processing unit permits the connection of the first virtual machine implementing device.

3. The virtual calculating machine system according to claim 1, wherein
    when the identification information does not include the identification information of the first virtual machine implementing device notified that the first appliance has been connected, the authentication processing unit does not permit the connection of the first virtual machine implementing device.

4. The virtual calculating machine system according to claim 1, wherein
    when the identification information includes the identification information of the first virtual machine implementing device to which the first appliance is connected, the second input and output control unit transmits the first data to the first virtual machine implementing device.

5. The virtual calculating machine system according to claim 1, wherein
    when the identification information does not include the identification information of the first virtual machine implementing device to which the first appliance is connected, the second input and output control unit transmits the first data to a second appliance that is connected to the second virtual machine implementing device and corresponds to the first appliance.

6. The virtual calculating machine system according to claim 1, wherein
    the identification information is information including an identifier to identify an appliance and an identifier to identify a virtual machine implementing device to which the appliance is connected.

7. The virtual calculating machine system according to claim 1, wherein
    when the communication-connection-destination-information includes identification information of the second virtual machine implementing device as a communication-connection-destination of the first appliance, the first input and output control unit transmits the second data to the second virtual machine implementing device.

8. The virtual calculating machine system according to claim 1, wherein
    when the communication-connection-destination-information does not include identification information of a communication-connection-destination of the first appliance, the first input and output control unit transmits the second data to the first virtual machine.

9. The virtual calculating machine system according to claim 1, wherein the communication-connection-destination is information including an identifier to identify an appliance, and an identifier to identify a virtual machine implementing device being a communication-connection-destination of the appliance.

10. A virtual-calculating-machine-control-apparatus comprising:
a virtual machine implementing device that implements one or a plurality of virtual machines by managing hardware resources;
an appliance connection detection processing unit to detect that an appliance has been detected;
a connected appliance notification processing unit to notify, using communication-connection-destination-information indicating a communication-connection-destination of each appliance, a communicatively connected virtual machine implementing device that the appliance has been connected, and to request the virtual machine implementing device to permit a connection; and
a first input and output control unit to transmit first data to the appliance upon receipt of the first data to the appliance from the virtual machine implementing device which permits the connection, and to transmit the second data to the virtual machine implementing device which permits the connection according to the communication-connection-destination-information, wherein
the communicatively connected virtual machine implementing device includes
a second input and output control unit to transmit the second data to a second virtual machine provided by the communicatively connected virtual machine implementing device upon receipt of the second data from the appliance of the virtual machine implementing device, and to, upon receipt of the first data to the appliance from the second virtual machine, transmit the first data to the first appliance of the virtual machine implementing device, wherein
when connection validity of the virtual machine implementing device is set to "Disabled" in identification information included in the communication-connection-destination-information, the first input and output control unit transmits the second data to the virtual machine upon receipt of the second data from the appliance,
when the connection validity of the second virtual machine implementing device is set to "Enabled", the first input and output control unit transmits to the communicatively connected virtual machine implementing device interrupt information indicating that the appliance is connected.

11. The virtual-calculating-machine-control-apparatus according to claim 10, wherein
when the communication-connection-destination-information includes identification information of the virtual machine implementing device, the first input and output control unit transmits the second data to the virtual machine implementing device upon receipt of the second data from the appliance.

12. The virtual-calculating-machine-control-apparatus according to claim 10, wherein
when the communication-connection-destination-information does not include identification information of the virtual machine implementing device, the first input and output control unit transmits the second data to the virtual machine.

13. An execution method of a virtual calculating machine system where a first virtual machine implementing device that implements one or a plurality of first virtual machines by managing hardware resources, and a second virtual machine implementing device that implements one or a plurality of second virtual machines by managing hardware resources are communicatively connected, the method causing the first virtual machine implementing device to execute
detecting that a first appliance has been connected,
notifying, using communication-connection-destination-information indicating a communication-connection-destination of each appliance, the second virtual machine implementing device being a communication-connection-destination of the first appliance that the first appliance has been connected, and
transmitting first data to the first appliance upon receipt of the first data to the first appliance from the second virtual machine implementing device, and transmitting second data to the second virtual machine implementing device according to the communication-connection-destination-information upon receipt of the second data from the first appliance, and
the method causing the second virtual machine implementing device to execute
determining, using identification information, whether to permit a connection for the first virtual machine implementing device notified that the first appliance has been connected when identification information of the first virtual machine implementing device is included as the identification information of a device for which the connection is permitted, and notifying the second virtual machine that the first appliance has been connected when the connection is permitted, and
transmitting the second data to the second virtual machine according to the identification information upon receipt of the second data from the first appliance of the first virtual machine implementing device, and, upon receipt of the first data to the first appliance of the first virtual machine implementing device from the second virtual machine, transmitting the first data to the first appliance of the first virtual machine implementing device according to the identification information, wherein
when connection validity of the second virtual machine implementing device is set to "Disabled" in the identification information included in the communication-connection-destination-information, the second data is transmitted to the first virtual machine,
when the connection validity of the second virtual machine implementing device is set to "Enabled", interrupt information indicating that the first appliance is connected is transmitted to the second virtual machine implementing device.

14. A control method of a virtual machine implementing device implementing one or a plurality of virtual machines by managing hardware resources, the method comprising:
detecting that an appliance has been connected;
notifying, using communication-connection-destination-information indicating a communication-connection-destination of each appliance, a communicatively connected virtual machine implementing device that the appliance has been connected, and requesting the virtual machine implementing device to permit a connection; and
transmitting first data to the appliance upon receipt of the first data to the appliance from the virtual machine implementing device which permits the connection, and transmitting the second data to the virtual machine implementing device which permits the connection according to the communication-connection-destination-information upon receipt of the second data from the appliance, wherein the communicatively connected virtual machine implementing device includes an input and output control unit to transmit the second data to a second virtual machine provided by the communicatively connected virtual machine implementing device upon receipt of the second data from the appliance of the virtual machine implementing device, and to, upon receipt of the first data to the appliance from the second virtual machine, transmit the first data to the first appliance of the virtual machine implementing device, wherein when connection validity of the second virtual machine implementing device is set to "Disabled" in the identification information included in the communication-connection-destination-information, the second data is transmitted to the first virtual machine, when the connection validity of the second virtual machine implementing device is connected to "Enabled", interrupt information indicating that the first appliance is connected is transmitted to the second virtual machine implementing device.

15. The virtual calculating machine system according to claim 1, wherein in accordance with an instruction from the first appliance, the first virtual machine implementing device operates software that runs on the second virtual machine provided by the second virtual machine implementing device, so as to operate, from the software, a second appliance that is different from the first appliance and that is connected to the first virtual machine implementing device.

16. The virtual calculating machine system according to claim 1, wherein the first input and output control unit transmits the interrupt information to the second virtual machine implementing device in which connection validity is set to "Enabled", which is selected from the plurality of the second virtual machine implementing devices.

17. The virtual-calculating-machine-control-apparatus according to claim 10, wherein the first input and output control unit transmits the interrupt information to the communicatively connected virtual machine implementing device in which connection validity is set to "Enabled", which is selected from one of the plurality of the communicatively connected virtual machine implementing devices.

* * * * *